D. L. PLANTE.
CORN PLANTER.
APPLICATION FILED SEPT. 4, 1915.
1,176,242.
Patented Mar. 21, 1916.
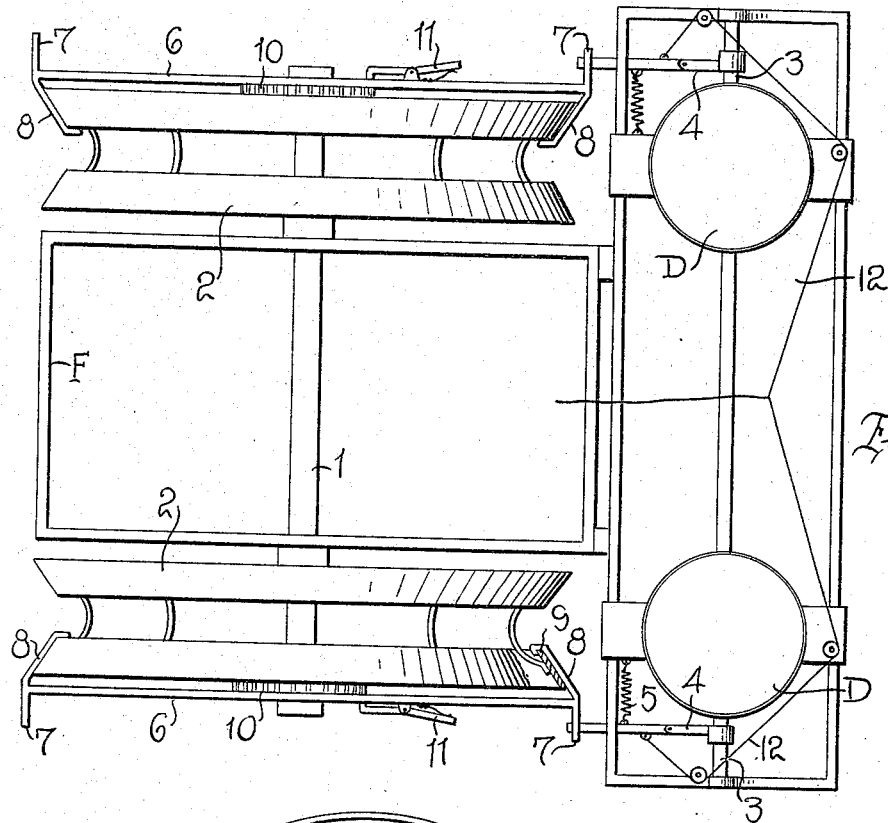
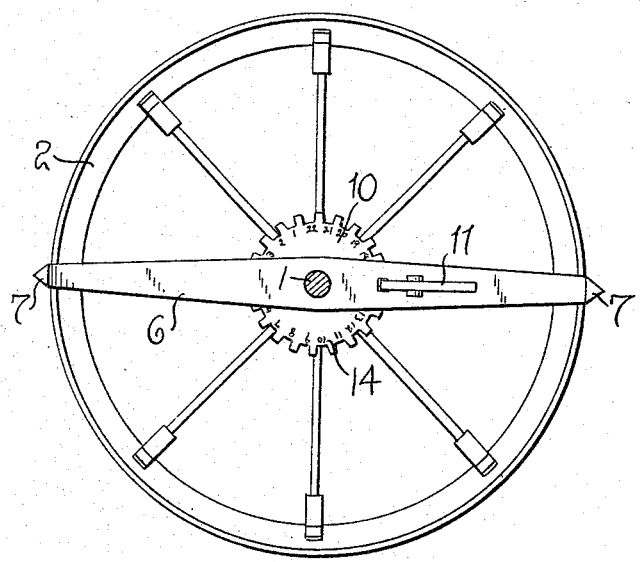
Inventor
D. L. PLANTE
By Watson E. Coleman
Attorney

UNITED STATES PATENT OFFICE.

DELORE L. PLANTE, OF CURRIE, MINNESOTA.

CORN-PLANTER.

1,176,242.   Specification of Letters Patent.   Patented Mar. 21, 1916.

Application filed September 4, 1915. Serial No. 49,044.

*To all whom it may concern:*

Be it known that I, DELORE L. PLANTE, a citizen of the United States, residing at Currie, in the county of Murray and State of Minnesota, have invented certain new and useful Improvements in Corn-Planters, of which the following is a specification, reference being had to the accompanying drawings.

This invention relates to certain improvements in corn planters; and it is an object of the invention to provide a device of this general character having novel and improved means whereby the dropping mechanism may be caused to operate through the medium of a mechanism coacting with a supporting wheel or wheels of the planter.

Furthermore, it is an object of the invention to provide a novel and improved device of this general character wherein the operating mechanism for the dropping mechanism may be readily adjusted so as to assure the proper operation of the dropping mechanism.

The invention consists in the details of construction and in the combination and arrangement of the several parts of my improved corn planter whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in top plan with parts in section, illustrating a planter constructed in accordance with an embodiment of my invention; and Fig. 2 is a side elevation of one of the supporting wheels with the co-acting axle shown in section, illustrating certain details of my invention as herein disclosed.

As disclosed in the accompanying drawings, F denotes the frame of my improved planter operatively engaged with the axle 1 on which are fixed the wheels 2 and arranged in close proximity to each of the wheels 2 is the dropping mechanism D including the shaft 3 which serves to drop the seed and said shaft has extending therefrom the arm 4 mounted for swinging movement laterally of the frame and normally maintained in an operative position through the medium of the retractable spring 5.

Loosely mounted upon the axle 1 adjacent each of the wheels 2 is the operating member 6, the extremities of which having secured thereto the outwardly disposed extensions 7 adapted to contact with the depending arm 4 so as to impart the requisite rocking movement to the shaft 3 as the planter advances, and it will be self-evident that the wheel 2 is of a circumference equal to two times the difference between adjacent hills.

The extremities of the operating member 6 are also provided with the inwardly disposed arms 8 overlying the periphery of the adjacent wheel 2 and having the hook like end portions operatively engaged with an annular shoulder 9 produced in the periphery of the wheel whereby said operating member 6 is conveniently and effectively maintained in operative assemblage.

Secured to each of the wheels 2 or to the axle 1 is a toothed disk 10 with which co-acts the pawl 11 carried by the operating member 6 for locking the member 6 against independent movement around the shaft 1, yet permitting the requisite adjustment of the member 6 to assure a proper setting so that the dropping mechanism D will be operated at proper times.

As is believed to be clearly apparent, two disks 10 are employed and the teeth of said disks are equal in number and correspondingly identified by the numerals 14 so that the operator may correctly set, with facility and convenience, each of the operating members 6. Operatively engaged with each of the arms 4 is a suitably guided flexible member 12 whereby said arm 4 may be swung out of the path of travel of the extensions 7 when it is desired to have the dropping mechanism D remain inoperative during the travel of the planter.

From the foregoing description, it is thought to be obvious that a corn planter constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A device of the character described comprising, in combination, a shaft, a supporting wheel fixed thereto, a dropping mechanism positioned relative to the supporting wheel and including a rock arm, an operating member loosely mounted upon the axle and provided with an extension engageable with the rock arm of the dropping mechanism, said operating member being provided with extensions overlying the periphery of the wheel, said wheel being provided with an annular shoulder with which said last named extensions are engageable, and releasable coacting means carried by the operating member and the axle for locking the operating member to the axle.

In testimony whereof I hereunto affix my signature in the presence of two witnesses.

DELORE L. PLANTE.

Witnesses:
B. H. WHITNEY,
ALPHONSE WAINE.

Copies of this patent may be obtained for five cents each, by addressing the "Commissioner of Patents, Washington, D. C."